United States Patent [19]

Benvenuti et al.

[11] Patent Number: 5,023,316
[45] Date of Patent: Jun. 11, 1991

[54] CATALYTIC POLYERMIZATION OF BETA-SUBSTITUTED-BETA-PROPIOLACTONES BY OLIGOMERIC ISOBUTYLALUMINOXANE

[75] Inventors: Manuela Benvenuti, Siena, Italy; Robert W. Lenz, Amherst, Mass.

[73] Assignee: Exxon Chemical Patents, Inc., Linden, N.J.

[21] Appl. No.: 538,296

[22] Filed: Jun. 14, 1990

[51] Int. Cl.$^5$ .................... C08G 63/08; C08G 63/84
[52] U.S. Cl. .................................................. 528/357
[58] Field of Search ........................................ 528/357

[56] References Cited

U.S. PATENT DOCUMENTS 3,259,607  7/1966  Cherdron et al. ................. 528/357
4,544,962  10/1985  Kaminsky et al. ............. 526/160 X

FOREIGN PATENT DOCUMENTS 676699  12/1963  Canada .
1454981  11/1976  United Kingdom .

OTHER PUBLICATIONS

Shelton et al., "Synthesis and Characterization of Poly(-B-hydroxybutyrate)", Polymer Letters 9, 173-178 (1971).

Primary Examiner—Earl Nielsen
Attorney, Agent, or Firm—M. B. Kurtzman

[57] ABSTRACT

A method of polymerizing at least one $\beta$-substituted-$\beta$-propiolactone in the presence of a catalytic amount of isobutylaluminoxane in a solvent for the $\beta$-propiolactone(s) and isobutylaluminoxane for a time and at a temperature to produce a poly($\beta$-substituted-$\beta$-propiolactone) polyester and the polyesters produced thereby are disclosed.

13 Claims, No Drawings

CATALYTIC POLYERMIZATION OF BETA-SUBSTITUTED-BETA-PROPIOLACTONES BY OLIGOMERIC ISOBUTYLALUMINOXANE

BAKCGROUND OF THE INVENTION

1. Field of the Invention

This invention relates to a method of polymerizing β-lactones in the presence of an organometallic catalyst. In particular, the invention relates to a method of polymerizing at least one β-substituted-β-lactone in the presence of an oligomeric aluminoxane catalyst.

2. Description of the Prior Art

It is known that β-substituted-β-propiolactone polymers are made by a wide variety of bacteria to serve as a source of both energy and carbon supply. Perhaps the best known of these bacterially produced polyesters is poly(β-hydroxybutyrate) (PHB) characterized by a structure having a repeat unit of the formula

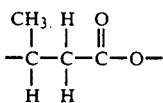

The bacterially-produced form of poly(β-hydroxybutyrate) is a highly crystalline, optically active and perfectly isotactic polyester.

Ring-opening polymerization of β-substituted-β-lactones in the presence of oligomeric aluminoxane catalysts to produce β-substituted-βpropiolactone polymers is known. Gross, et al. published a report on the polymerization of β-substituted-β-propiolactones using trialkylaluminum water catalytic systems in Macromolecules, Vol. 21, pp. 2657–2668, 1988. U.S. Pat. No. 3,259,607 to Cherdron, et al. discloses polymerization of β-propiolactones in the presence of a trialkylaluminum compound such aluminum triisobutyl and a controlled amount of water to act as a co-initiator. Specifically, Gross, et al. reported on the use of ethylaluminoxane (EAO), which Araki, et al. in *J. Polym. Sci., Polym. Lett. Ed.*, Vol. 16, pp. 519–523, 1978 disclose as polymeric in nature (EtAlO)$_n$, and methyaluminoxane (MAO) as catalysts to polymerize racemic β-butyrolactone (HB, β-methyl-β-propiolactone), racemic β-benzyl malolactonate (βM) and mixtures of racemic β-butyrolactone and racemic β-benzylmalolactonate to produce poly([R,S]-β-hydroxybutyrate), P([R,S]-HB), poly([R,S]-β-hydroxybutyrate-β-malolactonate), P([R,S]-HB-BM), and poly([R,S]-β-malolactonate), P([R,S]-BM), respectively.

Gross, et al. carried out the polymerization reactions using two types of the EAO catalyst, the first type, referred to as the "in-situ" catalyst, (EAOI), was prepared directly in the ampule used to carry out the polymerization reaction by adding a known amount of water to solution of triethylaluminum in toluene which had been cooled to a temperature of about −78° C. The mixture was stirred magnetically while warming to room temperature for 30 minutes. The resulting catalyst solution contained both gel-like translucent and white particles in a clear and colorless solution. The second type of EAO catalyst (EAOII) studied by Gross, et al. was a separately prepared catalyst which was purified to some extent before being added to the polymerization ampule for contact with the β-substituted-β-propiolactone monomers. The method of preparing the EAOII catalyst is set forth in the Gross, et al. publication. The EAOII catalyst consisted of a white powder which was dissolved in toluene to give a clear colorless solution of predetermined concentration. The MAO catalyst was also prepared separately resulting in a solid oligomeric MAO which was also dissolved in toluene.

The polymerization reactions reported by Gross, et al. were carried out in toluene as the reaction solvent at a temperature of about 60° C. for time periods ranging from about 7 to 14 days for homopolymerizations and as long as 27 days for copolymerizations. The resulting polymerization products ranged from yellow to light brown in color and were gel-like in consistency exhibiting variable fluidity.

The products were subjected to a preliminary purification to give a crude product which was subsequently treated with acetylacetone (AcAc) for removal of aluminum. Material which was insoluble in the acetylacetone was vacuum filtered to yield a solution from which the solvent (the AcAc to which a quantity of methanol had been added) was removed to yield an AcAc-treated product. Extraction of the AcAc-treated product with hot acetone yielded an acetone-insoluble fraction and an acetone-soluble fraction. Molecular weight determination by gel permeation chromatography (GPC), enthalpy of fusion ($\Delta H_m$), and peak melting temperature ($T_m$) were obtained for the AcAc-treated product, the acetone-insoluble fraction and the acetone soluble fraction resulting from each of the polymerization reactions which was carried out. The molecular weights were reported as the ratio of the weight-average molecular weight (Mw to the number average molecular weight ($M_n$). The heat of fusion ($\Delta H_m$) and melting temperatures ($T_m$) were determined by differential scanning colorimetry. $^{13}$C NMR, $^1$H NMR, and infrared spectra of the various fractions were also recorded. The $^{13}$C NMR and $^1$H NMR spectra were used in determining the degree of stereoregularity of the various fractions (AcAc-treated, acetone-soluble, and acetone-insoluble).

Gross, et al. report a yield of crude product in the homopolymerization of [R,S]-butyrolactone (BL) using the EAOII catalyst in toluene of 51%, a yield of the AcAc-treated product of 31%, and a yield of the acetone-insoluble fraction of 20%.

The acetone-insoluble fraction resulting from the homopolymerization reaction is of particular importance because it has a higher degree of isotactic stereoregularity which more closely approximates the perfectly isotactic (i.e. enantiomerically pure) structure of poly(β-hydroxybutyrate) (PHB) produced by a wide variety of bacteria.

The results for the homopolymerization of [R,S]-β-butyrolactone using the in-situ catalyst (EAOI) show similar values for the yield of the crude product, but significantly reduced yield of acetone-insoluble fraction which was approximately 10%. The polymerization of [R,S]-BL using the separately prepared MAO catalyst resulted in a much lower yield of crude product, approximately 22%, and a yield of approximately 16% of the acetone-insoluble fraction.

However, the highest overall yield of the acetone insoluble fraction resulted from the use of the EAO catalyst and the polymerization conditions reported by Araki, et al., 10 Macromolecules 1977, p. 277.

Gross, et al. also report a yield of crude product in the copolymerization of [R,S]-butyrolactone (BL) and [R,S]-benzyl malolactonate (BM) using the EAOII catalyst in toluene of about 15–27%, a yield of AcAc-treated product of about 10-23%, and a yield of the acetone-soluble fraction of about 9.2-19%.

The copolymerization of BL and BM using the in-situ catalyst in toluene resulted in a yield of crude product in the range of about 9-17%, and a yield of AcAc-treated product of about 3-6%. Due to the low yield of the AcAc treated product, fractionation into acetone soluble and acetone insoluble fractions was not carried out. The copolymerization of BL and BM using the separately prepared MAO catalyst in toluene resulted in a yield of crude product of about 26-32%, a yield of the AcAc-treated product of about 21-27% and a yield of the acetone-soluble fraction in the of about 19-23%.

The Cherdron, et al. patent discloses only in passing the use of an aluminum triisobutyl-water catalytic system in the polymerization of β-propiolactones. The Cherdron, et al. patent, however, does not specifically disclose polymerization of β-substituted-β-propiolactones and shows no working examples of the use of a triisobutylaluminum-water catalytic system to polymerize β-propiolactone monomers.

The previous attempts to polymerize β-substituted-β-propiolactones in the presence of aluminoxane catalysts have resulted in relatively low product yields while requiring as long as 27 or more days to complete the polymerization reaction.

It is believed that none of the prior art relating to the use of aluminoxane catalysts in polymerizing β-propiolactones specifically teaches the use of IBAO as a catalyst to polymerize β-substituted-β-propiolactone monomers to produce a polyester in high yield and in a reasonable reaction time.

It is therefore an object of the present invention to provide a method of polymerizing β-substituted-β-lactones in the presence of oligomeric IBAO catalyst which results in a higher yield of the desirable polymer in a reasonable polymerization reaction time than heretofore has been achieved in the prior art.

SUMMARY OF THE INVENTION

The foregoing and other objects of the present invention are achieved by polymerizing at least one β-substituted-β-propiolactone in the presence of a catalytic amount of isobutylaluminoxane in a solvent for the isobutylaluminoxane and for the β-substituted-β-propiolactone monomers for a time and at a temperature sufficient to produce a β-substituted-β-propiolactone polyester.

The β-propiolactone is substituted at the β position by any conventional non-interfering substituent. Suitable substituents include an organic residue, preferably those with not more than 12 carbon atoms, halo, nitro, and the like. Suitable organic residues included hydrocarbon residues, either unsubstituted or substituted, suitable substituents including halo and nitro, oxygen or sulfur-containing organic residues such as an ether residue or a carboalkoxy group (—COOR') wherein R' is alkyl, suitably up to 8 carbon atoms. Suitable hydrocarbon residues include alkyl, aryl, aralkyl, alkaryl, and cycloalkyl. Substituents containing up to 8 carbon atoms, particularly hydrocarbon substituents, are preferred. The β-substituted β-propiolactones are represented by the structural formula:

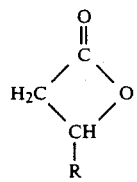

wherein R is the non-interfering substituent. The β-substituted β-propiolactone polyester produced by the present method has a repeat unit having the formula:

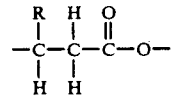

where R is the non-interfering substituent.

DETAILED DESCRIPTION OF THE INVENTION

The present invention relates a method of preparing β-substituted-β-propiolactone homopolymers and copolymers including a method of preparing poly(β-hydroxybutyrate) having structure and properties similar to the bacterially produced polyester.

The polyesters formed by the method disclosed herein are useful as biodegradable and general thermoplastic materials, for example, as biocompatible materials in medical applications and in drug delivery systems for the controlled release of pharmaceuticals in the body.

The method of the present invention involves polymerizing at least one β-substituted-β-propiolactone in the presence of a catalytic amount of isobutylaluminoxane (IBAO) in a solvent for the β-substituted-β-propiolactone(s) and for the IBAO for a time and at a temperature sufficient to produce the polyester.

The IBAO catalyst useful in the present invention is known and is believed to be oligomeric in nature. The structure of the catalyst is characterized by repeating units having the formula

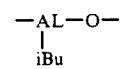

here iBu represents the isobutyl group.

In a manner similar to that disclosed in the Gross, et al. publication, the IBAO may be made in-situ. i.e. directly in the ampule used to carry out the polymerization reaction or may be prepared separately and subjected to some purification prior to being added to the solvent in which the polymerization is carried out.

U.S. Pat. No. 4,544,762 to Kaminsky, et al. discloses a method of preparing oligomeric alkyl aluminoxanes by reacting an aluminum trialkyl dissolved in an inert aliphatic or aromatic solvent at a temperature between −20 and 100° C. with an aluminum salt containing water of crystallization. Gianetti and co-workers, *J. Polym. Sci., Polym. Chem. Ed.*, Vol. 23, pp. 2117-2133 (1985) discloses that an aluminum sulfate salt used as a water source in the polymerization of methylaluminoxane (MAO) from Al(CH$_3$)$_3$ improved the degree of oligomerization obtained in the resultant MAO consequently enhancing its catalytic activity in the polymerization of ethylene.

The in-situ prepared form of IBAO may be made by adding an appropriate amount of water to a cooled ($-78°$ C.) solution of aluminum triisobutyl Al(iBu)$_3$ in appropriate solvent and stirring the resultant mixture while warming to room temperature for approximately 30 minutes. The solvent may be e.g. toluene or heptane, the concentration of the Al(iBu)$_3$ in the solvent may suitably range from 0.1 to 1.0 mole/l, and the ratio of moles water added to moles of Al(iBu)$_3$ may suitably be approximately equimolar. The monomers are then added directly to the catalyst solution thus prepared.

The separately prepared form of IBAO may be made in a manner similar to that disclosed by Gianetti, et al., e.g. by adding Al$_2$(SO$_4$)$_3$.6H$_2$O to a solvent such as toluene, n-hexane or n-heptane and adding dropwise a solution of Al(iBu)$_3$ in toluene, n-hexane or n-heptane thereto at room temperature with vigorous stirring for about one hour. The temperature of the resultant solution is increased to about $40°$ C. and reaction is allowed to proceed for about 12 hours at this temperature. After this time, the solution is filtered under an inert gas such as argon and is then concentrated under reduced pressure. The resulting residue is then subjected to repeated cycles of addition and evaporation of solvent, e.g., a 1:1 toluene/n-hexane mixture to ensure complete removal of unreacted Al(iBu)$_3$ The residue obtained is then dried at about $40°$ C. and under reduced pressure, e.g. $10^{-3}$ mmHg, to obtain an apparently crystalline white solid. The solid thus obtained is dissolved in dry toluene or heptane to form a clear, colorless catalyst solution which is preferably used within a 12 hour period from its preparation.

All catalyst preparations disclosed herein are conducted in glassware which had been flame dried while being alternately flushed with argon and evacuated and finally maintained under a positive pressure of argon. Transfers of the catalyst solutions are carried out either by cannulation or with a syringe, under an argon atmosphere. Transfers of the catalyst powders are carried out in a drybox under an inert atmosphere. The solvent for the catalyst is typically dried by reflux over sodium metal, followed by fractional distillation under an argon atmosphere.

In each of the following examples the following basic procedure, unless otherwise noted, is used to prepare the polymer. The ampules to be used for the polymerization are flame dried while flushing with vacuum and argon. All reactants added to the ampules are transferred with a syringe under an argon atmosphere. The appropriate catalyst solution is transferred into the ampule, except in the case of the in-situ prepared catalyst which is already present in the ampule as described above. The catalyst solution in the ampule is then cooled to $-78°$ C. and the monomer(s) are added. The contents of the ampules are degassed during three freeze-thaw cycles and finally sealed under vacuum. Polymerization reactions in the ampules are carried out at $60°$ C. for time periods ranging from to 5 to 10 days for homopolymerizations and from 20 to 27 days for copolymerization. The crude products are yellow and gel-like in consistency from the reactions carried out in toluene and white solid products are obtained from the reactions carried out in heptane. The ampules are opened at the end of the polymerization reaction periods and their contents are triturated and dispersed with a magnetic stirrer in ether. About 100 ml ether per g of initial monomer(s) is used. The ether contains about 1% water. The undissolved solid is vacuum filtered and added to chloroform (about 100 ml chloroform per g of initial monomer(s)) and the resulting suspension is stirred for 16 hours at $25°$ C. and refluxed for 10 minutes. The resulting clear chloroform solution is concentrated to about 10 ml chloroform per gram of initial monomer(s). This concentrated solution is precipitated into ether, and the solid is vacuum filtered and washed with ether to give the crude product. The crude product is treated with acetylacetone (AcAc) (10 ml AcAc per gram of crude product) to remove the aluminoxane catalyst. The crude product suspension in AcAc is then stirred for 25 hours at room temperature after which 10 ml of ether per milliliter of AcAc is added. The material which remains insoluble is vacuum filtered and washed with ether, and the solvent is removed to yield the AcAc-treated product. Extraction of the catalyst with AcAc as described removes the yellow color and increases the solubility of the resultant polymer. The AcAc-treated product is then separated into acetone-soluble and acetone-insoluble fractions using a Soxhlet extractor. The AcAc-treated products which are subjected to the acetone fractionation are first ground in a mortar and placed into the extractor thimbles and then extracted for 20 hours with hot acetone. The process thus described therefore results in four products of varying degrees of purity and separation, namely, the crude product, the AcAc-treated product and the acetone-insoluble and acetone-soluble fractions from the AcAc-treated product. For each example, the molecular weights, enthalpies of fusion ($\Delta H_m$) and melting temperature ($T_m$) are determined for the AcAc-treated product, the acetone-insoluble product and the acetone-soluble product. The enthalpies of fusion, melting temperatures and crystallinities are determined by differential scanning calorimetry (DSC). Molecular weight determinations are made by gel permeation chromatography (GPC) and molecular weights are reported in terms of the number average ($\overline{M}_n$) and weight average ($\overline{M}_w$) molecular weights. The polydispersities or ratio of $\overline{M}_n$ to $\overline{M}_w$ are also reported. $^{13}$C NMR spectra are obtained for the various products to assist in the determination of the structures by measuring stereoregularity and tacticity effects of the polymers produced. In the case of the copolymers, the $^{13}$C NMR spectra is useful in determining the copolymer compositions and monomer dyads sequence distribution. For the copolymers produced, the dyads sequence distributions determined by $^{13}$C NMR spectroscopy are compared with dyads sequence distribution calculated based on a Bernoullian or random statistical copolymerization model. In addition to the copolymer products, the ratio of comonomer units (in mole percent) of the AcAc-treated products are determined by $^1$H NMR and compared to the ratio of comonomers in the initial monomer feed to the polymerization ampule. Yields of the various products are also reported in the tables which follow after the Examples.

All molecular weight data reported in the Tables which follow are obtained by GPC using a Waters Model 6000A solvent delivery system and a Model 401 refractive index detector with $10^6$, $10^5$, $10^4$, $10^3$, and 500-A ultrastyragel columns in series. Chloroform is used as eluant to a flow rate of 1.0 mL/min. Sample concentrations are 5 mg/mL and injection volumes of 100 $\mu$L are used. Polystyrene standards, purchased from Polysciences, are used to generate a calibration curve. $^{13}$C NMR measurements are recorded at 75.4 MHz on a Varian XL-300 NMR spectrometer. $^1$H NMR measurements are recorded at 200 MHz on Varian XL-200 NMR spectrometer. The sample concentrations employed for $^{13}C$ NMR measurements ere typically 3.3% wt/vol, and a total 1500-5000 scans are accumulated. All spectra are recorded at 25-30° C. with CDCl$_3$ as solvent. CDCl$_3$ and tetramethylsilane (TMS) are used as internal references for $^{13}C$ and $^1H$ NMR spectra, respectively. The delay time between sampling pulses for both $^{13}C$ and $^1H$ NMR measurements is 3.0 s. Quantitative data for copolymer composition are obtained from $^1H$ NMR measurements described above.

Heats of fusion ($\Delta H_m$) and melting temperatures ($T_m$) for all polymer samples are determined with a Perkin-Elmer Model DSC-4. The weight sample is typically 5-10 mg. Samples are heated at a rate of 20° C./min from approximately 5 to 200° C., quickly cooled, and then scanned a second time by using the same heating rate and temperature range as the first scan. Data used for $\Delta H_m$ and $T_m$ are taken from the first scan. $T_m$ is taken as the peak of the melting endotherm. When multiple endotherms are observed, the $T_m$ from the higher temperature endotherm is reported. Infrared spectra are recorded on a Perkin-Elmer Model 283 spectrometer. C and H analyses are carried out by the Microanalysis Laboratory at the University of Massachusetts, Amherst.

The process of the present invention may be carried out using as monomer(s) a single $\beta$-substituted-$\beta$-propiolactone to produce a homopolymer or a mixture of different $\beta$-substituted-$\beta$- propiolactones to produce a copolymer. The molar ratio of aluminum to monomers in the initial reaction solution will typically range from 0.005 to 0.01. Yield of crude product and AcAc-treated product generally increases with higher levels of catalyst in the reaction mixture The initial monomer concentration in the solvent can vary widely. The use of approximately equal volumes of solvent and monomer is suitable.

The temperature will preferably be in the range of from 60 to 80° C. However, the polymerization may be carried out at temperatures near room temperature and up to the boiling point of the solvent. The reaction time will typically range from 3 to 5 days for both homopolymerization and copolymerization reactions. However, the time may be as short as one day or as long as 6 days or more.

In each of Examples 1-5, the monomer used is [R,S]-butyrolactone (BL) and the Catalyst is used in an amount to give a ratio of Al to monomer in the initial reaction mixture of 4 mole percent. In all of Examples 1-9, unless otherwise noted, the reaction was carried out at a temperature of 60° C. Preferably the reaction is carried out in alkaline solvent such as n-hexane or n-heptane or in an aromatic solvent such as toluene. Ethers and methylene chloride are also useful as solvents.

EXAMPLE 1

The basic procedure as described above is followed. The catalyst is ethylaluminoxane prepared in-situ as described above. The reaction time is 10 days and the solvent is toluene.

EXAMPLE 2

The basic procedure as described above is followed. The catalyst used is EAO produced by the reaction of triethylaluminum and AL$_2$(SO$_4$)$_3$.6H$_2$O as described above. The reaction time is 10 days and the solvent is toluene.

EXAMPLE 3

The basic procedure as described above is followed. The catalyst is the same as in Example 2. The reaction time is 7 days and the solvent is toluene.

EXAMPLE 4

The basic procedure as described above is followed. The catalyst is IBAO purchased from Shering. The reaction time is 7 days and the solvent is toluene.

EXAMPLE 5

The basic procedure as described above is followed. The catalyst is the same as in Example 4. The reaction time is 5 days and the solvent is heptane.

In each of the Examples 6-9 which follow, the monomers used are a mixture of [R,S]-butyrolactone (BL) and [R,S]-benzyl malolactonate (BM) in a mole percent ratio of from 55-25% BL to 45-75% BM and the catalyst is IBAO (purchased from Shering) in an amount to give a molar ratio of Al to monomers in the initial reaction mixture of from 0.005 to 0.01 mole percent.

EXAMPLE 6

The basic procedure as described above is followed. The reaction time is 20 days. The monomer feed ratio, BL:BM, is 55:45 (mole percent), and the solvent is heptane.

EXAMPLE 7

The basic procedure as described above is followed. The reaction time is 20 days. The monomer feed ratio BL:BM is 25:75 (mole percent), and the solvent is heptane.

EXAMPLE 8

The basic procedure as described above is followed. The reaction time is 27 days. The monomer feed ratio, BL:BM, is 45:55 (mole percent) and the solvent is toluene.

EXAMPLE 9

The basic procedure as described above is followed. The reaction time is 27 days. The monomer feed ratio, BL:BM, is 45:55 (mole percent) and the solvent is toluene.

The polymerization conditions and yields for Examples 1-5 are shown in Table I and for Examples 6-9 in Table II.

The molecular weights ($\overline{M}_w$ and $\overline{M}_n$) for the AcAc-treated product, acetone-soluble fraction, and acetone-insoluble fraction from Examples 1-5 are reported in Table III, and for Examples 6-9 in Table IV. Also reported in Tables III and IV are the enthalpies of fusion ($\Delta H_m$, cal/g) and peak melting temperature ($T_m$, °C.) for the AcAc-treated product and for the acetone-insoluble fraction from Examples 1-5 and 6-9, respectively.

Table V shows the experimental and calculated comonomer dyad fractions for the acetone-soluble and acetone-insoluble fractions from Examples 6-9.

The results for Examples 5 and 8-9 show that when the combination of the IBAO catalyst in heptane was used a 100% yield of crude product for both the homopolymerization of [R,S]-butyrolactone (BL) and for the copolymerization of [R,S]-butyrolactone and [R,S]-benzyl malolactonate (BM) are obtained. These results are in sharp contrast to the crude yield obtained with the EAO catalysts which ranged from 34-40% for the homopolymerization, and a similar yield when IBAO is used with toluene in the homopolymerization. When IBAO is used with toluene in the copolymerization, the crude yield obtained is approximately 70%. The crude lysts and IBAO in toluene are similar to those obtained by Gross, et al. However, the crude yields obtained in the copolymerization using IBAO in toluene or heptane are significantly higher than those reported by Gross, et al. The crude yields reported by Gross, et al. range from 9-27% for the copolymerization of BL and BM.

TABLE I

Polymerization Conditions and Yields for the Homopolymerization of [R, S]-Butyrolactone (BL)

| Pol. | Polymerization Condns. Time, days | Cat.[a] | Solvent | Al/monomer, % | Yield Crude % | Yield After AcAc[b] Treatment, % | Yield of Acetone-Insol. Fractn. From Crude Product, % |
|---|---|---|---|---|---|---|---|
| 1 | 10 | EAOI | toluene | 4 | 40 | 20 | 76.0 |
| 2 | 10 | EAOII | toluene | 4 | 34 | 17 | 77.2 |
| 3 | 7 | EAOII | heptane | 4 | 42 | 20 | 87.2 |
| 4 | 7 | IBAO | toluene | 4 | 40 | 20 | 68.3 |
| 5 | 5 | IBAO | heptane | 4 | 100 | 50 | 74.5 |

[a]EAO is ethylaluminoxane; IBAO is isobutylaluminoxane
[b]AcAc is acetylacetone

TABLE II

Characterization of the Product Fractions in Table I

| pol | Molecular Weight by GPC[a] AcAc[b]-Treated Prod[c] $M_w/M_n$ | Acetone Sol. Fractn $M_w/M_n$ | Acetone Ins. Fractn. $M_w/M_n$ | $\Delta H_m$[d] cal/g AcAc Treat | Act Ins | peak melting temp. °C. AcAc Treat | Act Ins |
|---|---|---|---|---|---|---|---|
| 1 | 632,000/77,000 (8.2) | 92,000/20,000 (4.6) | 970,000/100,000 (9.7) | 9.7 | 10.7 | 162 | 163 |
| 2 | 313,000/28,000 (11) | 62,000/31,000 (2) | 570,000/84,000 (7) | 5.5 | 16.7 | 157 | 161 |
| 3 | 322,000/36,000 (9) | 32,000/19,000 (2) | 631,000/74,000 (8) | 8.0 | 14.0 | 160 | 161 |
| 4 | 571,000/50,000 (11) | 121,000/40,000 (3) | 1,000,000/139,000 (7) | 11.0 | 12.8 | 163 | 166 |
| 5 | 323,000/36,000 (9) | 100,000/16,000 (6) | 637,000/87,000 (7) | 10.0 | 15.5 | 160 | 162 |

[a]Eluted with chloroform at 25° C.; the molecular weight averages were calculated on the basis of polystyrene standards.
[b]AcAc is acetylacetone
[c]Partially fractionated product which remained after AcAc treatment
[d]Determined by DSC during the first heating scan.

TABLE III

Polymerization Conditions and Yields for Copolymerization of [R, S]-Butyrolactone (BL) and [R, S]-Benzyl Malolactonate (BM)

| pol | Polymerization Condns Time, days | Cat.[a] | Solvent | Yield Crude, % | Yield After AcAc[b] Treatment, % | Monomer Feed[c] BL:BM; Polym Compst[d] HB:BM | Yield Acet Ins Fractn from Crude Prod, % |
|---|---|---|---|---|---|---|---|
| 6 | 20 | IBAO | heptane | 100 | 72.0 | 55:45; 57:43 | 11.2 |
| 7 | 20 | IBAO | heptane | 100 | 58.3 | 25:75; 25:75 | 49.2 |
| 8 | 27 | IBAO | toluene | 64 | 43.0 | 45:55; 46:54 | 24.0 |
| 9 | 27 | IBAO | toluene | 78 | 50.0 | 45:55; 45:55 | 11.0 |

[a]IBAO is isobutylaluminoxane;
[b]AcAc is acetylacetone;
[c]Data in mole percent of each monomer;
[d]Data in mole percent of comonomer units, determined by $^1$H NMR spectroscopy of the samples after AcAc treatment.

yields for the homopolymerization using the EAO cata-

TABLE IV

Characterization of the Product Fractions in Table III

| Pol | Molecular Weight by GPC[a] AcAc[b]-Treated Prod[c] $M_w/M_n$ | Acetone Sol Fractn $M_w/M_n$ | Acetone Ins Fractn $M_w/M_n$ | $\Delta H_m$[d] cal/g AcAc Treat | Act Ins | peak melting temp. °C. AcAc Treat | Act Ins |
|---|---|---|---|---|---|---|---|
| 6 | 270,000/52,000 (5.2) | 240,000/38,000 (6.3) | 600,000/70,000 (8.6) | 0.4 | 5.1 | 153 | 156 |
| 7 | 370,000/25,000 (15) | 200,000/29,000 (6.9) | 625,000/68,000 (9.2) | 2.8 | 5.1 | 156 | 160 |
| 8 | 230,000/34,000 (6.8) | 200,000/26,000 (7.7) | 400,000/60,000 (6.7) | 0.4 | 6.1 | 153 | 156 |
| 9 | 200,000/23,000 (8.7) | 120,000/14,000 (8.6) | 460,000/72,000 (6.4) | 1.2 | 11.5 | 160 | 162 |

[a]Eluted with chloroform at 25° C.; the molecular weight averages were calculated on the basis of polystyrene standards.
[b]AcAc is acetylacetone
[c]Partially fractionated product which remained after AcAc treatment
[d]Determined by DSC during the first heating scan

TABLE V

Experimental and Calculated Comonomer Dyad Fractions for
Poly([R, S]-hydroxybutyrate-co-[R, S]-benzyl malate) P(HB—BM)

| Polymer | Polym Compn[c] HB:BM | Dyad Sequence Contents | | | |
|---|---|---|---|---|---|
| | | HB—HB Obsd[a] (Calcd)[b] | HB—BM Obsd[a] (Calcd)[b] | BM—HB Obsd[a] (Calcd)[b] | BM—BM Obsd[a] (Calcd)[b] |
| 6, acet-sol frct | 54:46 | 0.39 (0.29) | 0.20 (0.25) | 0.25 (0.25) | 0.17 (0.21) |
| 6, acet-ins frct | 62:38 | 0.58 (0.39) | 0.12 (0.24) | 0.09 (0.24) | 0.20 (0.14) |
| 7, acet-sol frct | 35:65 | 0.15 (0.12) | 0.16 (0.23) | 0.21 (0.23) | 0.48 (0.42) |
| 7, acet-ins frct | 25:75 | 0.03 (0.06) | 0.13 (0.19) | 0.12 (0.19) | 0.72 (0.56) |
| 8, acet-sol frct | 44:56 | 0.28 (0.20) | 0.14 (0.25) | 0.26 (0.25) | 0.31 (0.31) |
| 8, acet-ins frct | 50:50 | 0.41 (0.24) | 0.04 (0.25) | 0.12 (0.25) | 0.42 (0.26) |
| 9, acet-sol frct | 43:57 | 0.19 (0.26) | 0.17 (0.25) | 0.22 (0.25) | 0.35 (0.32) |
| 9, acet-ins frct | 65:35 | 0.67 (0.43) | 0.03 (0.23) | 0.06 (0.23) | 0.24 (0.12) |

[a] Relative peak areas of the methylene carbon (2) for the comonomer dyad sequences determined by $^{13}$C NMR
[b] Calculated values from eq. 1-3, assuming a perfectly random distribution
[c] Data in mole percent of comonomer units, determined by $^1$H HMR spectroscopy, with spectrometer integration of the BM and HB methylene hydrogens.

Another significant result is that the 100% crude yield when IBAO in heptane is used in the homopolymerization is achieved after a reaction time of only 5 days. In contrast, reaction times of 7-10 days are necessary to achieve much lower crude yields when the other catalyst/solvent combinations are used.

Similarly, the 100% crude yield for the copolymerization using IBAO in heptane is achieved in 20 days as compared with 27 days using the other catalyst/solvent combinations which result also in much lower yield of crude product.

All three of the catalysts used in Examples 1-5 produce acetone-insoluble polymer fractions which have high degrees of isotactic stereoregularity and high molecular weights. In all cases, the acetone-soluble polymer fractions have lower degrees of stereoregularity, lower enthalpies of fusion and lower molecular weights than the acetone-insoluble fractions because of the higher degree of stereoregularity in the acetone-insoluble fractions. The AcAc-treated and acetone-soluble fractions have polydispersities ranging from 2-11 while the range for the acetone-insoluble fraction is 7-10, the enthalpy of fusion values for the acetone-insoluble fraction ranges from 10.7 to 16.7 cal/g and the peak melting temperature for this fraction ranges from 161-166° C.

In comparison, the enthalpy of fusion of the enantiomerically pure form of poly-β-hydroxy butyrate is 25 cal/g while the melting temperature, $T_m$, is 179° C. The discrepancies in these values between the laboratory-prepared PHB and the bacterially-produced PHB can be attributed to the presence of non-isotactic stereosequences in the laboratory-prepared PHB due to the imperfect stereoregulating ability of the aluminoxane catalysts.

The acetone-insoluble fraction from Example 5 in which the IBAO/heptane catalyst system is used has an 87% degree of isotacticity (84% isotacticity for Example 4 which uses IBAO in toluene) as compared with a 68% degree of isotacticity for the acetone-insoluble fraction from Example 3 in which an EAO/heptane catalyst system is used. The higher enthalpy of fusion for the acetone-insoluble fraction from Example 5 as compared with that determined for Examples 3 and 4 is consistent with its higher level of isotactic dyad sequences. Thus, the results indicate that the IBAO catalyst used in heptane or toluene yields an acetone-insoluble fraction which more closely approximates the structure of the enantiomerically pure, i.e. 100% isotatic structure of the bacterially-produced PHB. The IBAO catalyst appears to have a higher degree of stereoregulating ability.

The copolymers produced from Examples 6-9 have relatively low molecular weight acetone-soluble fractions, with $\overline{M}_w$ ranging from 120,000 to 240,000 while the acetone-insoluble fractions have molecular weights, $\overline{M}_w$, ranging from 400,000 to 625,000. The polydispersities of both fractions are in the range of about 6.3-9.2. Gel permeation chromatography reveals that the highly isotactic fractions have higher molecular weights and the highly atactic fractions have lower molecular weights.

The experimentally determined dyads sequence distribution for the acetone-soluble and insoluble fractions from Examples 6-9 are compared to the calculated values and the results are shown in Table V. The calculated values of the dyad fractions [HB-HB], [HB-BM], [BM-HB] and [BM-BM] are calculated by determination of the mole fraction of HB units in the copolymer, $F_{HB}$. The equations based on a Bernoullian or random statistical process for BM/HB copolymerization give:

$$[HB-BM] = F_{HB}^2 \qquad \text{(eq. 1)}$$

$$[HB-BM] = [BM-HB] = F_{HB}(1-F_{HB}) \qquad \text{(eq. 2)}$$

$$[BM-BM] = (1-F_{HB})^2. \qquad \text{(eq. 3)}$$

Good agreement between the calculated and the observed values is obtained for the acetone-soluble fractions of polymers 6-9, but poorer agreement is observed for the acetone-insoluble fractions. For the latter, the observed values of the HB-HB and BM-BM dyad fractions are considerably larger than the calculated values, whereas the HB-BM and BM-HB dyad fractions are lower. Both results indicating that longer blocks of HB and BM are present in the acetone-insoluble fractions than expected for statistical copolymers.

In summary, the results presented above show the polymerization of B-substituted-β-propiolactones with the IBAO catalyst in heptane or toluene result in higher yield of crude product in a shorter reaction time than heretofore has been reported in the prior art. The higher crude product yield translates into a higher yield of the fractionated products. When IBAO in heptane was used, crude yields of 100% are obtained. In the case of the poly(β-hydroxybutyrate), the acetone insoluble fraction, which is of particular importance, shows a higher degree of stereoregular isotactic structure which supports the conclusion that the IBAO catalyst has a higher degree of stereoregulating ability than the aluminoxane catalysts which have been used in the prior art.

What is claimed is:

1. A method of preparing a polyester comprising polymerizing at least one β-substituted-β-propiolactone in the presence of a catalytic amount of isobutylaluminoxane in a solvent for said isobutylaluminoxane and for said β-substituted-β-propiolactone for a reaction time and at a temperature sufficient to produce said polyester.

2. The method of claim 1 wherein said process comprises copolymerizing two different β-substituted-β-propiolactones to produce a copolyester.

3. The process of claim 1 wherein said β-substituted-β-propiolactone comprises [R,S]-β-butyrolactone.

4. The process of claim 2 wherein said dissimilar β-substituted-β-propiolactones comprise [R,S]-β-butyrolactone and [R,S]-β-benzyl malolactonate.

5. The process of claim 1 wherein said solvent is selected from the group consisting of heptane, toluene, and hexane.

6. The process of claim 1 wherein said solvent comprises heptane.

7. The process of claim 1 wherein said reaction time is in the range of from about 3 to 5 days.

8. The process of claim 2 wherein said reaction time is in the range of from about 3 to 5 days.

9. The process of claim 1 wherein said temperature is in the range of from about 60 to 80° C.

10. The process of claim 1 wherein said isobutylaluminoxane is present in an amount to give a mole percent range of Al to β-substituted-β-propiolactone monomer from about 0.005 to 0.01.

11. The process of claim 2 wherein said isobutylaluminoxane is present in an amount to give a mole percent range of Al to β-substituted-β-propiolactone monomers of from about 0.005 to 0.01.

12. A polyester made by the process of claim 1.

13. A copolyester made by the process of claim 2.

* * * * *

UNITED STATES PATENT AND TRADEMARK OFFICE
CERTIFICATE OF CORRECTION

PATENT NO. : 5,023,316
DATED : June 11, 1991
INVENTOR(S) : Benvenuti et al

It is certified that error appears in the above-indentified patent and that said Letters Patent is hereby corrected as shown below:

On the title page, Item [73]: Assignee; please delete "Exxon Chemical Patents, Inc., Linden, New Jersey", and substitute therefor --University of Massachusetts, Amherst, Massachusetts--.

Signed and Sealed this

Twenty-ninth Day of March, 1994

Attest:

BRUCE LEHMAN

Attesting Officer        Commissioner of Patents and Trademarks